Patented May 19, 1936

2,040,902

UNITED STATES PATENT OFFICE 2,040,902

ABSORPTION REFRIGERATION

Glenn F. Zellhoefer, Bloomington, Ill.

No Drawing. Application April 18, 1935,
Serial No. 17,065

5 Claims. (Cl. 252—5)

The present invention relates generally to a solvent material and a refrigerant mixture for absorption refrigerating machines, both of the two-fluid type and of the three-fluid type.

In absorption refrigeration there is required a solvent material adapted to remain liquid throughout the operation of the apparatus, and a refrigerant material adapted to have a liquid and a vapor phase in the cycles of operation, adapted to be dissolved or absorbed in the solvent, adapted to be evaporated or boiled as a vapor from the solvent mixture and from the solvent, and adapted to be condensed from the vapor to a liquid. Numerous refrigerants and numerous solvents are known, as well as successful combinations of these.

The two-fluid absorption machines have certain mechanical parts which may be omitted or which are not duplicated in three-fluid machines. In a three-fluid machine, there is in addition to the two-fluid mixture a body of inert gas which is always gas, and which does not to any substantial extent dissolve in any of the components of the two-fluid composition, or in mixtures thereof.

The present invention is directed to a new solvent for absorption refrigeration, and to combinations thereof with refrigerants.

A particular object of the invention is the use of tetrahydrofurfuryl methoxyacetate as a solvent.

Another object is the use of a combination of said solvent with the refrigerant dichloromonofluoromethane.

Examples of the two-fluid apparatus in which the new solvent material and the new combination may be used is disclosed in my co-pending application Serial No. 651,306, filed January 12, 1933, or in my U. S. Patent No. 1,895,698, issued January 31, 1933. Other examples may readily be cited, and will be known to those skilled in the art.

The two-fluid apparatus above referred to, briefly described, comprises a still in which a liquid mixture of solvent and refrigerant is heated to distill away as a vapor the refrigerant material, a condenser wherein said vapor is condensed to a liquid state, an evaporator wherein the resulting liquid is vaporized at reduced pressure to produce refrigeration, and an absorber in which vapor of the refrigerant material containing added heat units (acquired in the refrigerating process) is again dissolved in the solvent material. Suitable heat exchanging and circulating means are included, and automatic controls may be provided.

The particular characteristics of such a machine are that the still operates at temperatures well above normal temperatures, such, for example, at 210° F. to 250° F.; and that the cooling unit operates at temperatures lower than normal, such as from 15° F. to 50° F. Various parts of the apparatus differ in the prevailing temperatures and pressures, and both pressure and temperature determine the physical state of the free refrigerant material, whether gaseous or liquid, and determine the solubility relations between the refrigerant and the solvent material. It is, therefore, very important that the solvent and the refrigerant materials be physically adapted for use as individual materials in certain places and for certain functions, and that they be mutually adapted for certain functions when they are in combination. Other qualities not essential to refrigeration, but pertinent to practical usage, control or limit the choice of solvent or refrigerant, such as odor, viscosity, heat capacity, boiling point, freezing point, volatility, chemical stability, reactivity, corrosive action, inflammability, toxicity, etc.

By considering the limitations herein set forth and suggested, I have been able to utilize tetrahydrofurfuryl methoxyacetate as a solvent, for practical usage, in combination with the refrigerant dichloromonofluoromethane, which is little known.

The new solvent is herein named as tetrahydrofurfuryl methoxyacetate. In order to leave no doubt as to its identity, its structural formula is herein given:

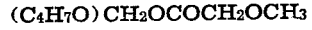

The refrigerant herein specified is dichloromonofluoromethane. In order to leave no doubt as to its identity, its structural formula is herein given:

In the accompanying claims the invention is set forth as a combination useful in absorption refrigeration. It is to be understood that a simple adulteration of the new solvent in its pure form, either by reason of commercial impurities, or by addition of lesser quantities of other material, useful also as solvent, is permitted, and such a composition is intended to fall within the scope of the present invention.

An extended study has been made of the solubility of halogenated derivatives of methane and ethane in the ether and ester derivatives of tetrahydrofurfuryl alcohol, involving eleven individual representative derivatives. The refrigerants studied in conjunction with this group of solvents are: dichloromonofluoromethane ($CHCl_2F$); trichloromonofluoromethane ($CCl_3F$); dichlorodifluoromethane ($CCl_2F_2$); methyl chloride ($CH_3Cl$); ethyl chloride ($C_2H_5Cl$).

From this study it has been determined that the solubility characteristics of one halogenated derivative of methane or ethane cannot be used to predict the solubility characteristics of a different halogenated derivative of methane or ethane.

With respect to the solubility characteristics of dichloromonofluoromethane in these derivatives, the following observations may be made:

Derivatives of tetrahydrofurfuryl alcohol in which the hydroxyl hydrogen has been replaced by a relatively short carbon chain acyl, alkyl or alkoxy-acyl radical are good solvents for dichlorofluoromethane in refrigerant mixtures.

Where the acyl, alkyl or alkoxy-acyl radical consists of a relatively long carbon chain in a derivative of tetrahydrofurfuryl alcohol, the boiling point is raised but the solubility of dichloromonofluoromethane in the product is less than a corresponding derivative in which the acyl, alkyl, or alkoxy-acyl radical consists of a shorter carbon chain.

Aromatic ether or ester derivatives of tetrahydrofurfuryl alcohol are suitable but less satisfactory solvents for dichloromonofluoromethane in refrigerant mixtures than a corresponding derivative in which a short carbon chain acyl, alkyl, or alkoxy-acyl radical is used.

In ($C_4H_7O$)$CH_2R$, where R is $OCH_3$, $OC_2H_5$, $OCOCH_3$, $OCOCH_2OCH_3$, or $OCOCH_2OC_2H_5$, the compounds are good solvents for dichloromonofluoromethane in refrigerant mixtures.

It may be predicted as a result of said extended study, that in any of the above indicated series of compounds where R is $OCH_3$, the product will be the better solvent for dichloromonofluoromethane, than when R is $OC_2H_5$; these compounds better than where R is $OCOCH_3$; these compounds better than where R is $OCOCH_2OCH_3$; these compounds better than where R is $OCOCH_2OC_2H_5$. It may also be predicted as a result of said extended study, that in any one of the above indicated series of compounds where R is $OCH_3$, the product will have a lower boiling point than where R is $OC_2H_5$; these compounds will have a lower boiling point than where R is $OCOCH_3$; these compounds will have a lower boiling point than where R is $OCOCH_2OCH_3$; these compounds will have a lower boiling point than where R is $OCOCH_2OC_2H_5$.

This application is a continuation in part of co-pending applications Serial No. 721,549, filed April 20, 1934, and Serial No. 756,981, filed December 11, 1934, and is generic to combinations disclosed in both of them, and claimed specifically in Serial No. 756,981.

What I claim is:

1. A refrigerant mixture for the absorption type of refrigeration apparatus consisting of tetrahydrofurfuryl methoxyacetate as the essentially predominant solvent, and dichloromonofluoromethane as a refrigerant.

2. A refrigerant mixture for the absorption type of refrigeration apparatus consisting of a dichloromonofluoromethane as a solute, and a solvent therefor consisting of ($C_4H_7O$)$CH_2R$ as the essentially predominant solvent, where —R may be selected from the group consisting of: $OCH_3$, $OC_2H_5$, $OCOCH_3$, $OCOCH_2OCH_3$, and $OCOCH_2OC_2H_5$.

3. A refrigerant mixture for the absorption type of refrigeration apparatus consisting of tetrahydrofurfuryl methoxyacetate as the essentially predominant solvent, and a volatile chemically stable halogenated hydrocarbon refrigerant soluble in said solvent.

4. A refrigerant mixture for the absorption type of refrigeration apparatus consisting of a volatile chemically stable halogenated hydrocarbon refrigerant as a solute, and a solvent therefor consisting of ($C_4H_7O$)$CH_2R$ as the essentially predominant solvent, where —R may be selected from the group consisting of: $OCH_3$, $OC_2H_5$, $OCOCH_3$, $OCOCH_2OCH_3$, and $OCOCH_2OC_2H_5$.

5. A refrigerant mixture for the absorption type of refrigeration apparatus consisting of a volatile chemically stable halogenated hydrocarbon refrigerant as a solute, and a solvent therefor consisting of a derivative of tetrahydrofurfuryl alcohol as the essentially predominant solvent, wherein the hydroxyl hydrogen has been replaced by an ether- or ester-forming group.

GLENN F. ZELLHOEFER.